United States Patent [19]
Chudoba et al.

[11] Patent Number: 5,628,597
[45] Date of Patent: May 13, 1997

[54] SPRING URGED FASTENER FOR LOCATION IN AN OPEN RAIL SECTION

[75] Inventors: Josef Chudoba, Järnlundsvägen 2, S-121 72 Johanneshov, Sweden; Sven-Erik Kaufeldt, Vällingby, Sweden

[73] Assignee: Josef Chudoba, Johanneshov, Sweden

[21] Appl. No.: 428,182

[22] PCT Filed: Nov. 3, 1993

[86] PCT No.: PCT/SE93/00918

§ 371 Date: May 3, 1995

§ 102(e) Date: May 3, 1995

[87] PCT Pub. No.: WO94/10466

PCT Pub. Date: May 11, 1994

[30] Foreign Application Priority Data

Nov. 4, 1992 [SE] Sweden ............... 9203294

[51] Int. Cl.⁶ ................................................ F16B 37/04
[52] U.S. Cl. .................................................... 411/85
[58] Field of Search ........................... 411/83, 84, 85, 411/101, 103, 104

[56] References Cited

U.S. PATENT DOCUMENTS

| | | | |
|---|---|---|---|
| 2,767,609 | 10/1956 | Cousino | 411/85 |
| 3,005,292 | 10/1961 | Reiland | 411/84 |
| 4,758,124 | 7/1988 | Ingeberg | 411/85 |
| 4,784,552 | 11/1988 | Rebentisch | 411/104 |
| 4,950,099 | 8/1990 | Roellin | 411/85 |
| 5,116,161 | 5/1992 | Faisst | 411/85 |

*Primary Examiner*—Flemming Saether

[57] ABSTRACT

A spring-biassed nut includes a generally rectangular nut body which has a spring device fitted on one main surface thereof. The nut can be fitted into a slotted hollow rail by inserting the nut through the rail slot in the direction of its plane. The spring tightens the nut against the rail legs defining the rail slot, so that the nut will be held in a chosen position along the rail by friction. A pivot point around which the long-edge flange of the nut pivots when the nut is first inserted into the rail is defined in the interior of the rail, preferably in the inner corner region between the rail sidewall and the flange. The length of the nut as measured between the edges of the long-edge flanges is essentially equal to or slightly smaller than the distance between the pivot point and the edge of the opposing rail flange. The spring device has springs which are compressed as the nut is rotated into the rail and which are partially relieved of their load after the nut has been rotated into the rail, so as to force the nut to take a slot centered position.

20 Claims, 3 Drawing Sheets

SPRING URGED FASTENER FOR LOCATION IN AN OPEN RAIL SECTION

The present invention relates to a spring-biassed nut arrangement in which a nut is fitted with a spring and which is intended for movement along and within a slotted hollow profiled rail.

BACKGROUND OF THE INVENTION

A spring fitted to a nut functions to press the nut against an inner surface of the two mutually opposing rail flanges that define a slot in the rail, so that as a result of contact between the nut and the flanges, the nut will remain in a position to which it is set along the rail. A screw can be inserted through the slot and screwed into a nut exposed in the slot.

In the simplest case, the spring-biassed nut is fitted by inserting the nut from one end of the rail. It is desirable, however, to be able to fit the nut generally radially into the rail through the slot at any chosen position therealong. The nut shall be held against rotation in the rail and in order to be on the safe side, it is necessary to avoid nut constructions which include movable parts by means of which the nut is fitted to the rail.

DESCRIPTION OF THE BACKGROUND ART

DE-C-2,635,439 and SE-B-427,211 describe spring-biassed nuts of the desired kind which lack mutually movable parts for insertion of the nut in the rail and which prevent the nut from rotating when fitted.

The rails concerned can be combined to form an apparatus support stand or frame structure, apparatus cabinet, cable holder or the like, and because the nuts can be displaced along the rails a great deal of freedom is provided with regard to positioning of the screws by means of which the apparatus, the cabinet or the like is secured to the rails of said structure.

The type of spring-biassed nut arrangement disclosed in DE-C-2,635,439 and SE-B-427,211, however, is unsatisfactory in operation, particularly with regard to its fitting to the rail. For instance, the task of fitting the nut manually to the rail is difficult to achieve, since it is first necessary to heavily compress the spring of the known nut and then to insert the nut, with the spring compressed, in through the slot in the rail while holding the nut in a position which deviates from the fitted position of the nut by 90°. This nut arrangement requires primarily a rail having a depth which is greater than the length of the nut in its insertion direction, and the spring is relieved of its compressive load immediately it has passed through the slot in the rail, therewith allowing the spring to expand. Since it is necessary to turn the nut through an angle of 90° after having inserted the nut through the slot, the process of fitting the nut can become extremely difficult at times. For instance, there is the risk that the nut will be unintentionally turned through 90° in the "wrong" direction, so that the nut faces towards the bottom wall of the rail while the spring faces the slot. Naturally, there is also the risk of the nut spring supporting against the bottom-wall region of the slot in a decentred position. A further drawback with this known type of spring-biassed nut arrangement is that it is very difficult to remove the nut from the rail radially through the slot.

Because the spring-biassed nut requires a large amount of free space within the hollow rail, the rail is relatively large in relation to the nut and is given a depth which is at least equal to the internal width of the rail. This results in mechanical strength problems and leads to a relatively high consumption of material in the manufacture of the rail, and also creates geometrical problems with regard to extruded profiled elements of generally rectangular cross-section, in which each element side defines two mutually opposing flanges and an intermediate slot in a hollow profiled rail for spring-biassed nuts of the aforedescribed kind.

Accordingly, one object of the present invention is to provide a spring-biassed nut which can be easily fitted manually into an associated slotted rail and which enables the relative depth of the rail to be limited.

Further objects of the invention are stated directly or indirectly herein, or will be realized by the person skilled in this art.

The object of the invention is achieved with a fastening apparatus including a body member having a pair of opposing substantially parallel side members. Each of the side members includes an outwardly extending flange. An annular conically tapering member is attached to the body member and extends therefrom. The annular conically tapering member is located approximately equidistant between the side members. A leaf spring is attached to the annular conically tapering member. The leaf spring has a pair of spaced-apart substantially mirror-image spring members extending substantially parallel to the side members. The leaf spring includes an aperture located approximately equidistant between the spring members. The annular conically tapering member may be located within the aperture. The annular conically tapering member may include a threaded hole located therein.

The body member further includes a pair of opposing substantially parallel end members. Each of the end members extends substantially perpendicular to the side members. The end members each include a stiffening element extending upwardly from the body member in a direction away from the annular conically tapering member. The stiffening elements have a length extending between opposed end portions. The outwardly extending flanges extend beyond the end portions of the stiffening elements. The outwardly extending flanges may be tapered upwardly and outwardly.

The body member is locatable within a longitudinally extending elongated hollow rail. The hollow rail includes a bottom wall, a pair of opposing side walls, a pair of spaced-apart upper leg portions, and a slot located between the spaced-apart upper leg portions. The tapered flanges of the body member may engage correspondingly tapered inner surfaces of the upper leg portions of the hollow rail when the body member is located within the hollow rail. The body member is insertable into the hollow rail through the slot by a pivoting motion of the body member about one of the flanges.

In one embodiment of the hollow rail, the pair of opposing side walls are inclined outwardly proceeding in a direction from the bottom wall to the upper leg portions. The body member is locatable within this hollow rail such that the spring members engage the opposing side walls to center the body member within the hollow rail.

In another embodiment of the hollow rail, the bottom wall includes a central projection extending in a longitudinal direction of the hollow rail. The body member is locatable within this hollow rail such that the spring members engage the central projection to center the body member within the hollow rail.

In still another embodiment of the hollow rail, four of the hollow rails are incorporated into a generally rectangular member such that bottom walls of the hollow rails form a central core of the generally rectangular member, with the leg portions of the hollow rails facing outward.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail with reference to exemplifying embodiments thereof and also with reference to the accompanying drawings, in which.

DETAILED DESCRIPTION OF THE PREFERRED EMBODIMENT

Figure 1:
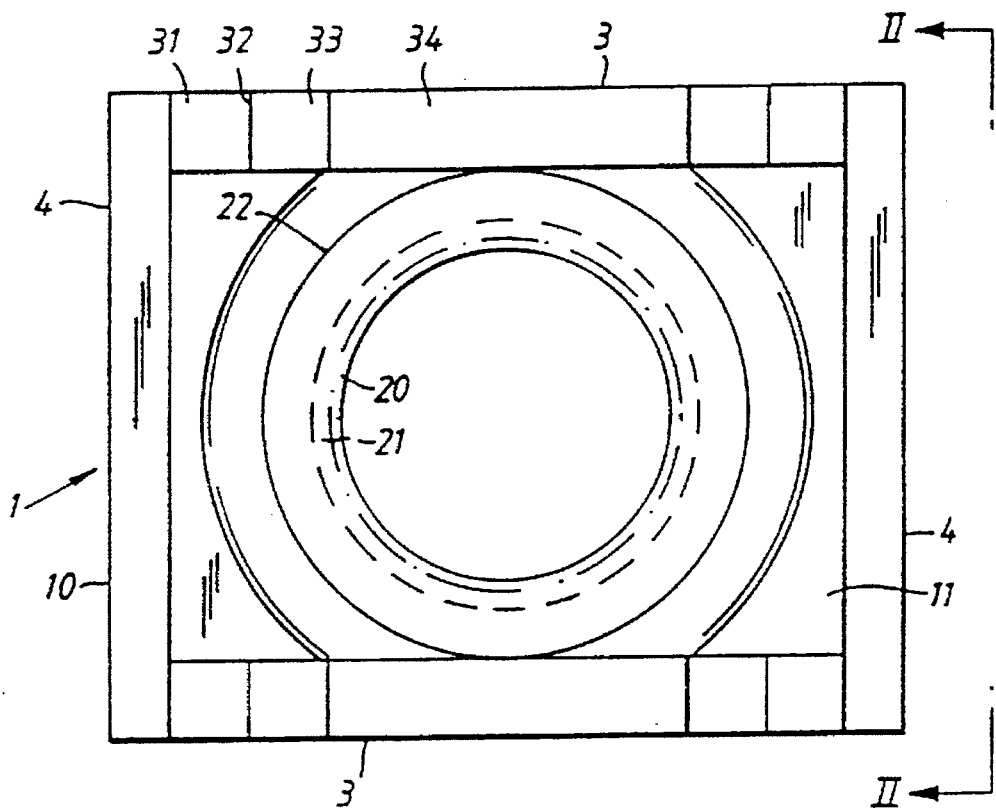
FIG. 1 illustrates schematically an inventive spring-biassed nut from above.
Figure 2:
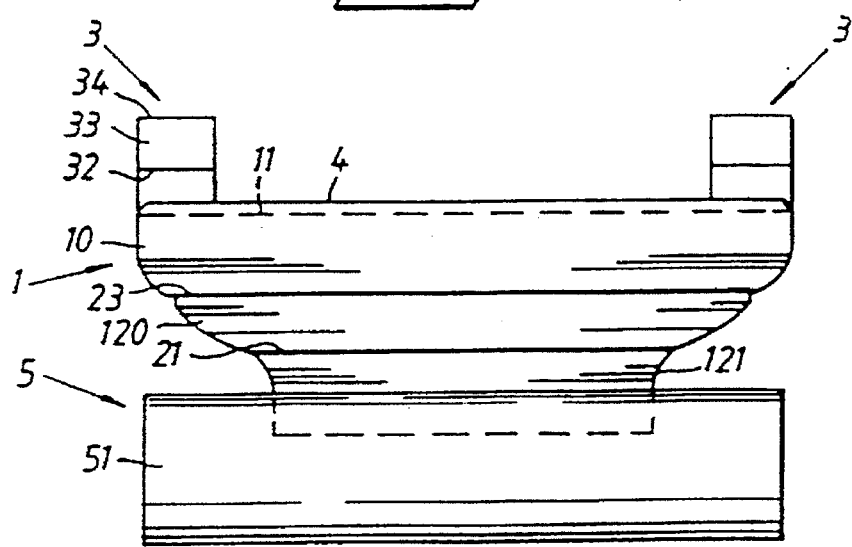
FIG. 2 is a side view of the nut shown in FIG. 1, taken on the line II—II of FIG. 1.
Figure 3:
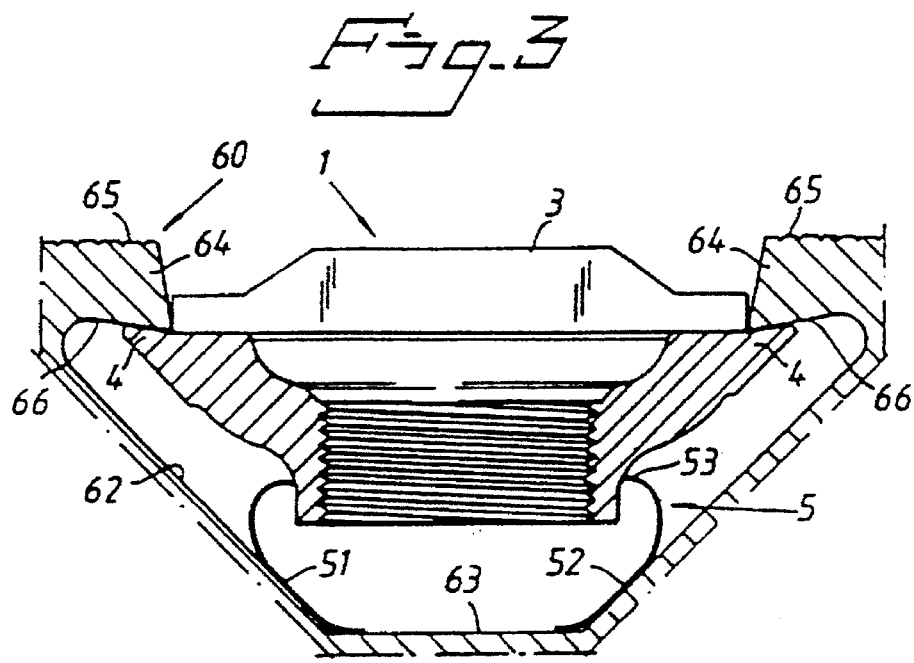
FIG. 3 illustrates schematically fitting of the inventive nut into a hollow rail.

FIGS. 1–3 illustrate a preferred embodiment of the inventive spring-biassed nut, which is intended for coaction with a hollow profiled rail which preferably has the cross-sectional shape indicated in FIG. 3.

The nut 1 includes a rectangular, approximately square body 10 formed from a sheetmetal blank in whose centre there is punched a deep-drawn hole. The blank also includes two mutually opposing long-edge elements 3 which are bent-up through an angle of 90° to form a stiffening element. The body 10 thus includes a generally flat circumferential region which merges with a cylindrical part which includes the internal screw-thread 20 of the nut body, via an annular conically tapering part 21.

A generally C-shaped spring element 5 has essentially the same length as the body 10. Provided centrally in the web 53 of the C-shaped element 5 is an opening which encircles the outer side 121 of the screw-threaded body part and which is fixed thereto, for instance press-fitted thereto.

As shown in FIG. 3, the length of respective long-edge elements 3 corresponds essentially to the free distance between the mutually opposing legs of the rail, i.e. corresponds to the width of the slot in the rail 60. It will also be seen that each long-edge element 3 has stepped height portions 31, 33 and a centre part 34, so as to be subjected to essentially the same bending or flexural strain along the whole of its length. The body 10 includes wedge-shaped flanges 4 whose upper surfaces 41 are angled upwardly through about 10° from the main surface of said body.

The legs 64 of the rail 60 have an inner surface 66 which slopes correspondingly through an angle of about 10° to the plane defined by the outer surfaces of the legs, so that the upper flange surfaces 41 and the inner leg surfaces 66 will be in flat engagement with one another. Thus, if the nut 1 is subjected to a force tending to pull the nut out of the rail, the legs are able to flex outwardly to some extent in the absence of slip between the flanges and the legs in the main plane of the nut surface.

In FIG. 2, the line 23 illustrates the transition between the generally flat part of the nut body and the conical part thereof, the outer surface of said conical part being referenced 120. The circle 22 represents the transition or junction between the upper flat surface 11 of the nut body and the conical inner surface of the conical part. The outer surface of the generally cylindrical deep-drawn part is referenced 121.

As will be seen from FIG. 3, the spring 5 urges the spring-biassed nut 1 upwardly into contact with the legs 64 of the rail, so as to hold the nut 1 in a desired position along the rail 60. It will also be seen that legs 51, 52 of the spring 5 support against side-wall regions of the rail 60, thus providing a nut centering function which centres the nut in relation to the centre of the groove. Although it will be evident from FIG. 3 that the nut is held centered because the outer corners of the legs 64 engage in corresponding angled recesses between the end-walls 32 of the long-edge elements 3 and the nut flanges 4, the centering function of the spring 5 has particular significance with regard to fitting the nut in the rail 60.

Figure 5:
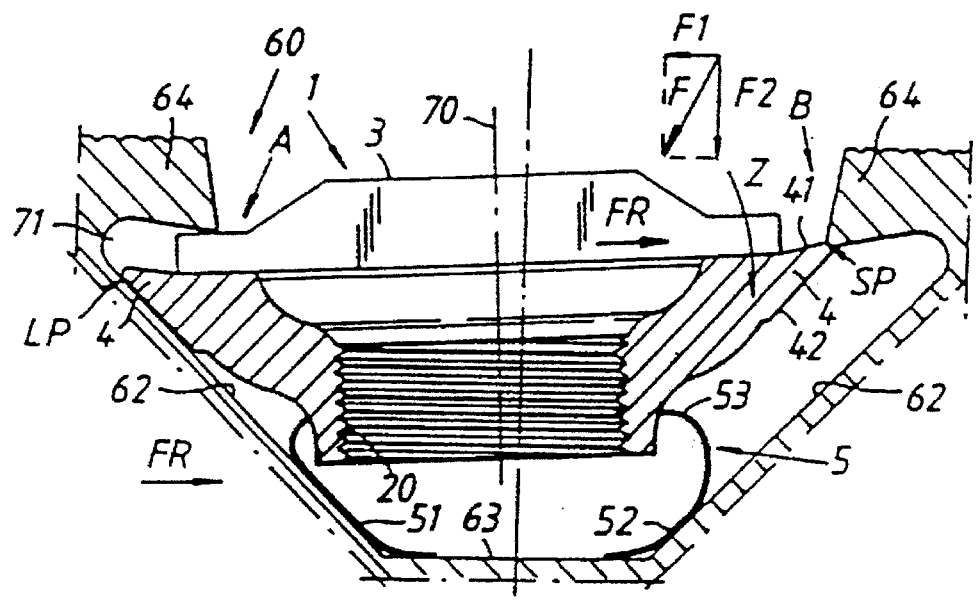
FIG. 5 illustrates schematically fitting of the inventive nut into a hollow rail.

FIG. 5 illustrates a stage in which one flange part A of the nut 1 has been inserted into the inner corner region 71 between the legs 64 and the side-wall 62 while compressing one leg 51 of the spring in a general direction which lies in the plane of FIG. 5 and which is parallel with the upper flat surface 11 of the nut body 10.

The end-part A of the nut body 10 is in contact with the wall 62 in a region referenced LP. The width of the nut between the tips of the flanges 4 is slightly smaller than the distance between the point LP and the corner point SP on the legs 64. It will be seen that when the end-part A is inserted as far as possible into the inner corner region 71, the nut 1 is able to swing around the point LP, so that the movable flange 4 is able to pass the opposite point SP with a small clearance thereto, wherein this swinging movement, generally indicated by the arrow Z, is counteracted by compression of the spring leg 51. When the flange 4 has passed beyond the point SP, the reaction force FR exerted by the spring leg 51 will displace the nut 1 so that the flange 4, which was earlier free, is driven in beneath the leg 64 at the region B and grips the leg 64. As a result of the effect exerted by the upper surfaces 41 and the inner surfaces 66, there is obtained an automatic, centering wedge action, due to the force exerted axially by the spring 5.

It will be seen that the rail 60 has a free cross-section which tapers conically from its upper slotted part 65 in a direction towards the slot bottom region 63 against which the spring 5 acts.

An important feature of the inventive arrangement is that the nut is constructed for insertion of one end region A inwardly of one leg 64 of the rail 60 and for subsequent rotation of the nut against the action of a laterally acting spring element, so that the chosen length of the nut will allow the opposing flange part of the nut to just pass the opposite leg of the rail, whereafter the force exerted by the compressed spring is employed to displace the nut until its earlier free flange grips beneath the adjacent leg.

Schematically illustrated in FIG. 5 is a force vector F which can be assumed to be exerted by the operator with a finger of one hand, wherein the force F can be divided into a force component F2 which acts generally in the axial direction 70 of the nut, and a force component F1 which results in an oppositely acting reaction force FR, as described above.

The person skilled in this art will perceive that the nut can be easily removed from the rail 60, for instance by inserting a screwdriver into the screw-threaded hole of the nut, so as to press down the nut 1 and forcing one edge-region A into the inner corner 71, as illustrated in FIG. 5, and then twisting the nut up around the pivot point LP with the aid of the screwdriver.

Figure 4:
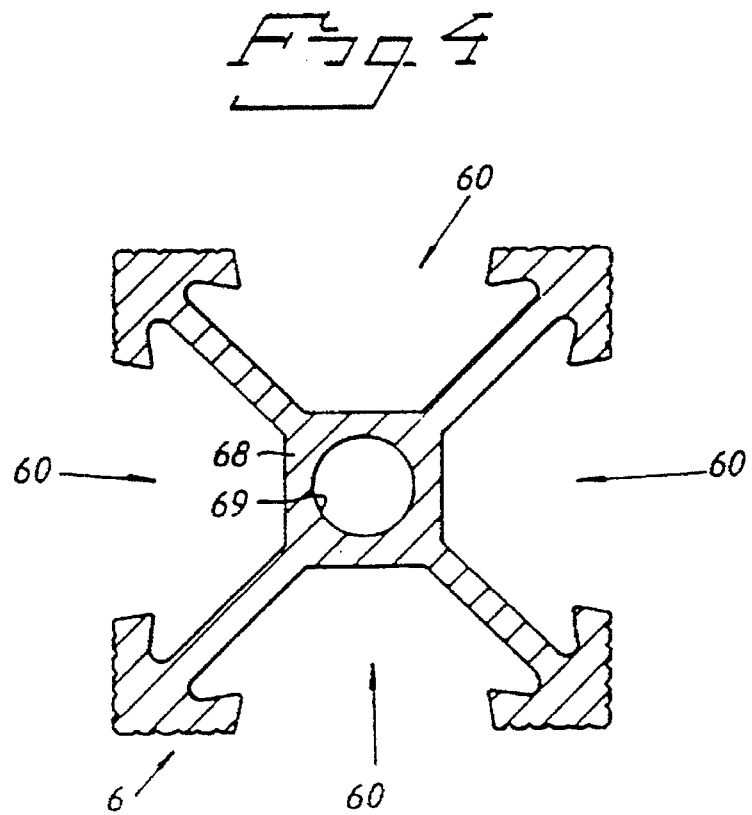
FIG. 4 is a schematic cross-sectional view of a profiled element comprising four mutually identical hollow rails of the kind indicated in FIG. 3.

As shown in FIG. 4, the inventive spring-biassed nut enables the rail 60 to be tapered conically down towards its bottom part. Consequently, rails 60 can advantageously be combined to form an element 6 which includes four mutually identical rails 60, wherein the element 6 has a central, generally rectangular part 68 in which a penetrating cylindrical passageway 69 can be provided, for instance, so as to enable several such elements 6 to be joined together or to facilitate mounting of the element 6 on a supportive surface.

One feature of the invention is that in addition to its conventional function, the spring arrangement has a laterally acting spring function which presses the nut against the inner surface of respective rail flanges.

Another feature of the invention is that the rail is configured so as to form preferably in its upper part a pivoting point for one flange of the nut when the nut body extends through the rail slot and the spring arrangement is located within the rail. Another feature is that the length of the nut body is adapted so that as the nut swings around this pivot point, the other flange of said nut will just pass the adjacent leg of the rail while compressing the spring device on the opposite side thereof, so that said spring device will drive the nut towards a slot centered position as soon as the other flange has passed the rail leg.

Although it has been indicated above that the nut pivoting point lies on the tip of the nut flange 4, it will be seen from FIG. 5 that the actual point about which the nut swings may be formed at least temporarily by the contact point between the long edge elements 3 and the rail legs 64, or the contact point between the side-walls 62 and the underside 42 of the flange. In this regard, it is important that the length of the nut is so chosen that the free end of the nut will just swing past the adjacent legs 64 and that a nut pivoting region is found, for example in the rail angle between leg and side-wall.

Although the hollow space defined by the profiled rail has been shown to have a generally trapezoidal cross-sectional shape by way of example, it will be understood that other cross-sectional shapes are possible, for instance, a generally rectangular shape. Furthermore, the spring-biassed nut has been shown to coact with a side-wall of the hollow rail, on the basis that the rail has an upper slotted wall, a bottom wall and two side-walls. It will be understood, however, that the bottom wall may alternatively have a raised portion or a sunken portion and that the nut spring can be arranged to coact with the side-walls of said portions in a manner to centre the nut in the slot. In this case, the nut spring is provided with spring means capable of coacting with both sides of the recessed portion or raised portion. The spring shall also support against upwardly turned surfaces in the hollow rail so as to tension the nut upwardly into stable frictional contact with downwardly facing rail surfaces. The internal width of the hollow rail between the side surfaces thereof will preferably be greater than the height between the bottom wall and the legs of the rail. The hollow space contained by the rail and the spring nut will preferably have a cross-sectional shape which is symmetrical in relation to a centre plane between the rail legs and the nut flanges respectively.

Figure 6:
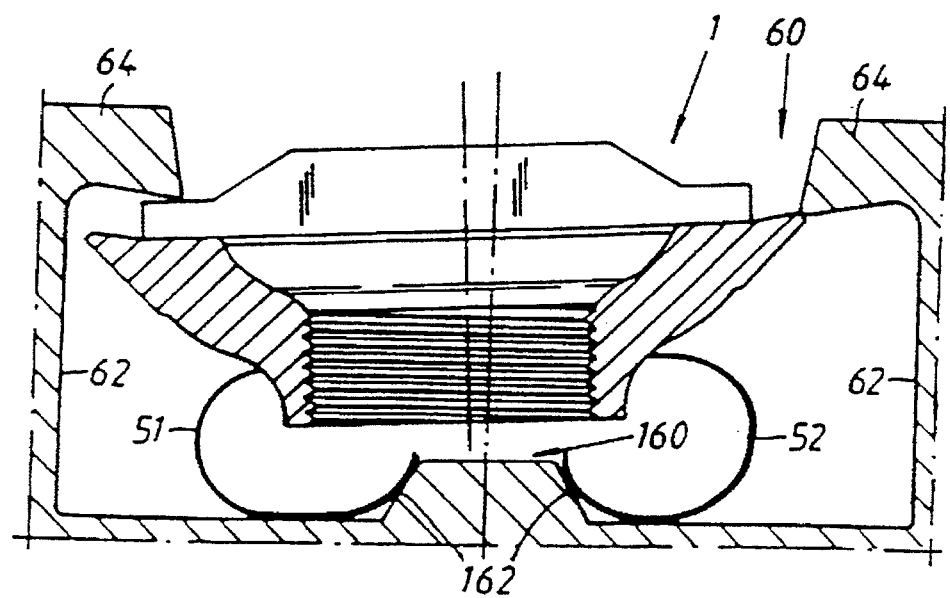
FIG. 6 illustrates schematically a variant of the nut and its hollow rail in a view corresponding to the view of FIG. 5.

The variant illustrated in FIG. 6 corresponds to the variant illustrated in FIG. 5 with the following exceptions. The bottom region of the profiled hollow rail includes a central, longitudinally extending elevation 160 which forms a guide strip. The nut has spring legs 51, 52 which are formed for coaction with the sides 162 of the elevation 160, so that at least one of the nut spring legs will support against one side 162 and be compressed thereby as the nut is swung in through the slot, and then move the nut to a central position in relation to the slot, at the same time as the spring legs 51, 52 press the nut against the rail legs 64. In the case of the FIG. 6 embodiment, the spring-biassed nut device has the form of a rectangular sheetmetal element and the nut body extends through a centre region of said element. Two mutually opposing edge-parts of the element are bent through an angle of about 270°, for instance, to form the spring legs 51, 52, and are intended to receive and contact the elevation 160 therebetween.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fastening apparatus comprising:
a body member having a pair of opposing substantially parallel side members, each of said side members including an outwardly extending flange;
an annular conically tapering member attached to said body member and extending therefrom, said annular conically tapering member being located approximately equidistant between said side members; and
a leaf spring attached to said annular conically tapering member, said leaf spring having a pair of spaced-apart substantially mirror-image spring members extending substantially parallel to said side members.

2. The fastening apparatus according to claim 1, wherein said leaf spring includes an aperture located approximately equidistant between said spring members, said annular conically tapering member being located within said aperture.

3. The fastening apparatus according to claim 2, wherein said annular conically tapering member includes a threaded hole located therein.

4. The fastening apparatus according to claim 3, wherein said body member further includes a pair of opposing substantially parallel end members, each of said end members extending substantially perpendicular to said side members.

5. The fastening apparatus according to claim 4, wherein said end members each include a stiffening element extending upwardly from said body member in a direction away from said annular conically tapering member.

6. The fastening apparatus according to claim 5, wherein said stiffening elements have a length extending between opposed end portions, and wherein said outwardly extending flanges extend beyond said end portions of said stiffening elements.

7. The fastening apparatus according to claim 1, wherein said annular conically tapering member includes a threaded aperture located therein.

8. The fastening apparatus according to claim 7, wherein said body member further includes a pair of opposing substantially parallel end members, each of said end members extending substantially perpendicular to said side members.

9. The fastening apparatus according to claim 8, wherein said end members each include a stiffening element extending upwardly from said body member in a direction away from said annular conically tapering member.

10. The fastening apparatus according to claim 9, wherein said stiffening elements have a length extending between opposed end portions, and wherein said outwardly extending flanges extend beyond said end portions of said stiffening elements.

11. The fastening apparatus according to claim 1, wherein said body member further includes a pair of opposing substantially parallel end members, each of said end members extending substantially perpendicular to said side members.

12. The fastening apparatus according to claim 11 wherein said end members each include a stiffening element extending upwardly from said body member in a direction away from said annular conically tapering member.

13. The fastening apparatus according to claim 12, wherein said stiffening elements have a length extending between opposed end portions, and wherein said outwardly extending flanges extend beyond said end portions of said stiffening elements.

14. The fastening apparatus according to claim 1, and further comprising a longitudinally extending elongated hollow rail, said hollow rail including a bottom wall, a pair of opposing side walls, a pair of spaced-apart upper leg portions, and a slot located between said spaced-apart upper leg portions.

15. The fastening apparatus according to claim 14, wherein said pair of opposing side walls are inclined outwardly proceeding in a direction from said bottom wall to said upper leg portions, and wherein said body member is locatable within said hollow rail such that said spring members engage said opposing side walls to center said body member within said hollow rail.

16. The fastening apparatus according to claim 15, wherein said leaf spring includes an aperture located approximately equidistant between said spring members, said annular conically tapering member being located within said aperture, said annular conically tapering member includes a threaded hole located therein;

said body member further includes a pair of opposing substantially parallel end members, each of said end members extending substantially perpendicular to said side members;

said end members each include a stiffening element extending upwardly from said body member in a direction away from said annular conically tapering member;

said stiffening elements have a length extending between opposed end portions;

said outwardly extending flanges extend beyond said end portions of said stiffening elements;

said outwardly extending flanges are tapered upwardly and outwardly;

said flanges engage correspondingly tapered inner surfaces of said upper leg portions when said body member is located within said hollow rail; and said body member is insertable into said hollow rail through said slot by a pivoting motion of said body member about one of said flanges.

17. The fastening apparatus according to claim 14, wherein said bottom wall includes a central projection extending in a longitudinal direction of said hollow rail, and wherein said body member is locatable within said hollow rail such that said spring members engage said central projection to center said body member within said hollow rail.

18. The fastening apparatus according to claim 17, wherein said leaf spring includes an aperture located approximately equidistant between said spring members, said annular conically tapering member being located within said aperture;

said annular conically tapering member includes a threaded hole located therein;

said body member further includes a pair of opposing substantially parallel end members, each of said end members extending substantially perpendicular to said side members;

said end members each include a stiffening element extending upwardly from said body member in a direction away from said annular conically tapering member;

said stiffening elements have a length extending between opposed end portions;

said outwardly extending flanges extend beyond said end portions of said stiffening elements;

said outwardly extending flanges are tapered upwardly and outwardly;

said flanges engage correspondingly tapered inner surfaces of said upper leg portions when said body member is located within said hollow rail; and said body member is insertable into said hollow rail through said slot by a pivoting motion of said body member about one of said flanges.

19. The fastening apparatus according to claim 14, wherein said outwardly extending flanges are tapered upwardly and outwardly, and wherein said flanges engage correspondingly tapered inner surfaces of said upper leg portions when said body member is located within said hollow rail.

20. The fastening apparatus according to claim 14, wherein four of said hollow rails are incorporated into a generally rectangular member such that bottom walls of said hollow rails form a central core of said generally rectangular member with said leg portions of said hollow rails facing outward.

* * * * *